Oct. 11, 1938.  A. W. TONDREAU  2,133,063
FOLLOW FOCUS DEVICE
Filed June 24, 1935  4 Sheets-Sheet 1
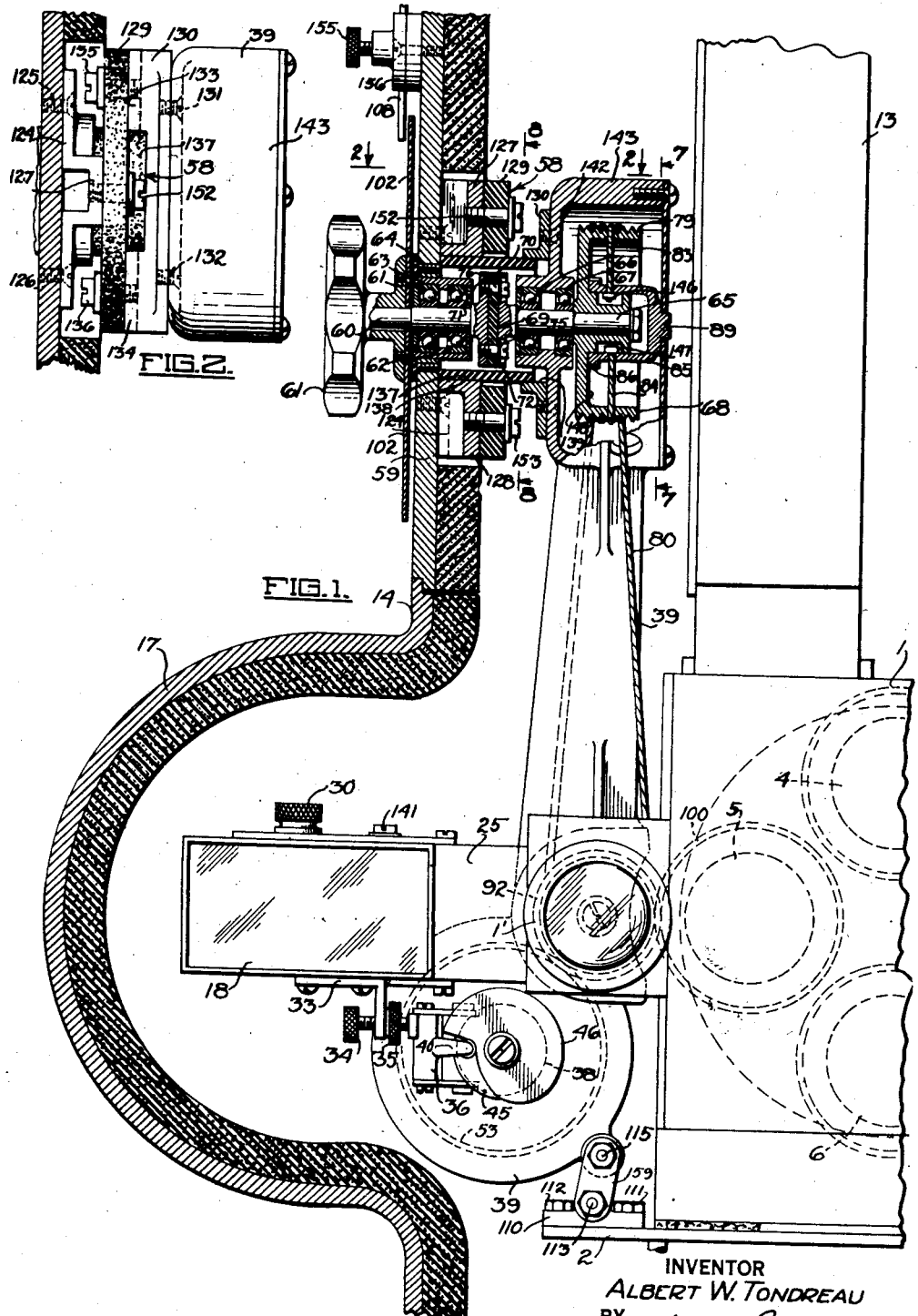
INVENTOR
ALBERT W. TONDREAU
BY
ATTORNEY Oct. 11, 1938.　　　A. W. TONDREAU　　　2,133,063
FOLLOW FOCUS DEVICE
Filed June 24, 1935　　　4 Sheets-Sheet 2

INVENTOR.
ALBERT W. TONDREAU
BY
W. U. Beatty
ATTORNEY.

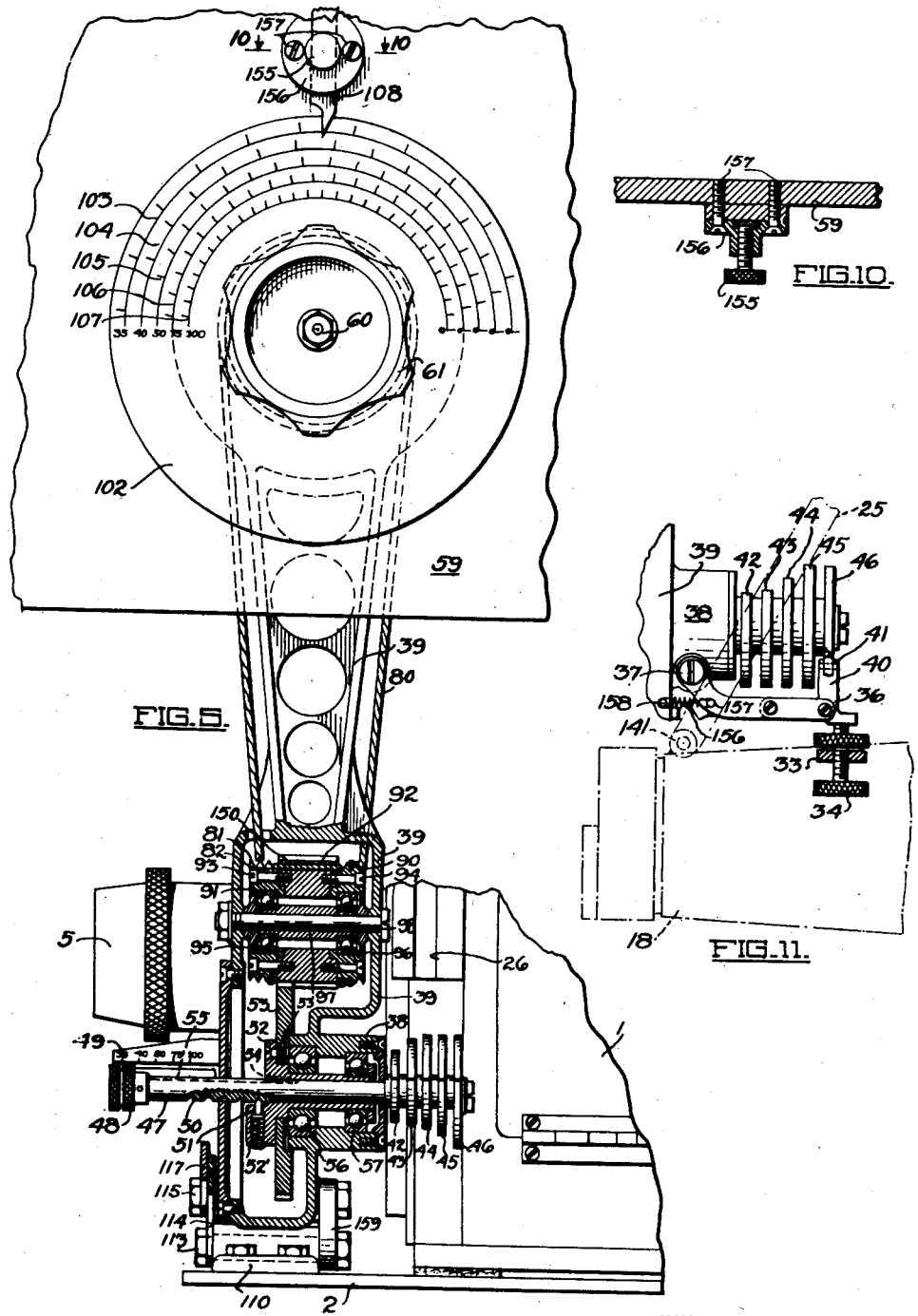

Oct. 11, 1938.                A. W. TONDREAU                2,133,063
                             FOLLOW FOCUS DEVICE
                            Filed June 24, 1935                4 Sheets-Sheet 4

INVENTOR
ALBERT W. TONDREAU
BY W. E. Beatty
ATTORNEY

Patented Oct. 11, 1938

2,133,063

UNITED STATES PATENT OFFICE 2,133,063

FOLLOW FOCUS DEVICE

Albert W. Tondreau, Hollywood, Calif., assignor to United Research Corporation, Long Island City, N. Y., a corporation of Delaware Application June 24, 1935, Serial No. 28,102

10 Claims. (Cl. 88—16)

This invention relates to motion picture cameras and more particularly to a follow focus device to be used with a motion picture camera enclosed in a sound-proof casing.

With the advent of sound motion pictures, it became necessary to enclose the motion picture camera and its associated parts in a sound-proof housing to eliminate the noise of the moving parts thereof from reaching the recording microphone. This made it extremely difficult to photograph a running or action shot as there was no convenient means for accurately adjusting the focus of the objective lens and at the same time following the path of the action with a viewfinder from outside of the sound-proof casing.

A second fault that is encountered in making motion pictures with the use of a plurality of lenses of different focal characteristics is that the stereo-parallax that must be compensated for between a follow focus viewfinder and an objective lens varies for each different lens that is used.

Heretofore, the sound-proof casing or blimp has been provided with one or more doors which must be opened in order to permit focusing the main objective lens and/or for orienting the viewfinder and/or for focusing the viewfinder. This is objectionable, as it is frequently desirable to adjust one or more of these elements while the camera is in operation for the purpose of photographing action in synchronism with sound. It is undesirable to open the sound-proof casing in this case, however, because the noise of the camera may reach an adjacent microphone.

An object of the invention is to focus the camera lens and/or orient the viewfinder while permitting the blimp to remain closed.

This is accomplished by providing a control knob at the exterior of the blimp, and by providing a driving connection between this control knob and the camera lens and/or the viewfinder for orienting the latter. Preferably, this driving connection is of such a nature that the camera lens is focused simultaneously with the orientation of the viewfinder so that the viewfinder will have the same photographic field as the camera.

For further details of the invention reference may be had to the accompanying drawings, wherein:

Fig. 1 is a rear elevational view with parts in section of my preferred form of follow focus device shown attached to a standard motion picture camera provided within a sound-proof "blimp".

Fig. 2 is a plan view taken along the line 2—2 of Fig. 1.

Fig. 5 is a side elevational view partly in section of the follow focus device.

Fig. 10 is a plan sectional view of the adjustable pointer and is taken along the line 10—10 of Fig. 5.

Fig. 11 is a plan view showing the arrangement of cams and a cam follower for controlling the position of the viewfinder.

Figures 3, 4:
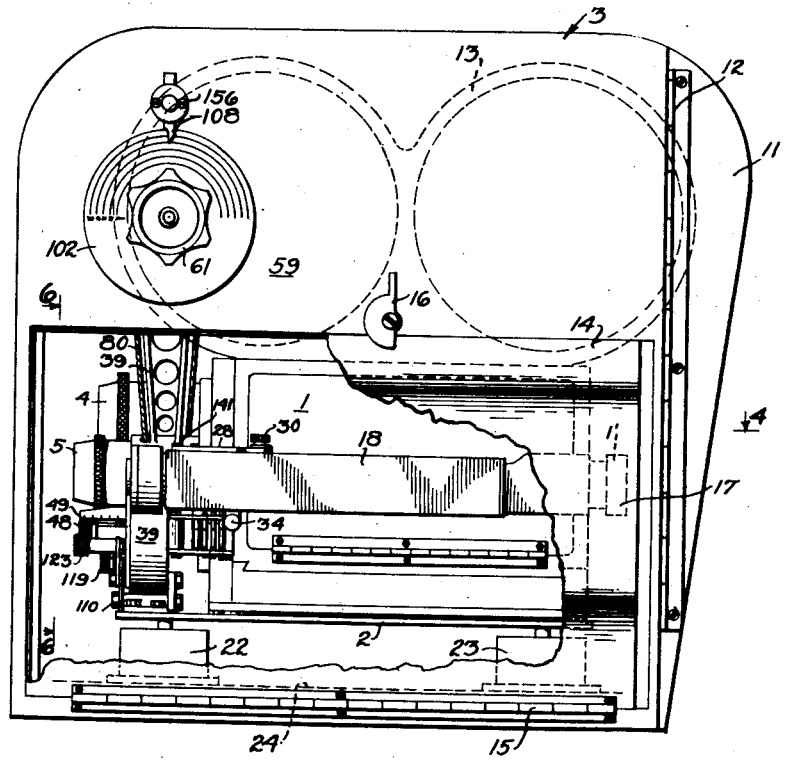
Fig. 3 is an elevational view of the camera blimp partly broken away to show the arrangement of the follow focus device.
Fig. 4 is a plan sectional view taken on the line 4—4 of Fig. 3.

Referring now to Figs. 1, 3, 4, and 6, a standard motion picture camera 1 is mounted upon a supporting plate 2 provided in a sound-proof casing or blimp generally indicated at 3. A conventional focusing tube 1' is provided integral with the side of the camera 1 but is inoperative while the camera is used within the camera blimp 3 in conjunction with the follow focus device. A plurality of objective lenses such as 4, 5, and 6, is provided in the front of the camera 1 and is mounted on a lens turret 7. Each of these objective lenses has a different focal length. The lens turret 7 is adapted to be rotated so as to bring any one of the lenses 4, 5, and 6 into the position before the film aperture (not shown). An indexing pin 8 provided on the front face of the camera 1 is adapted to engage any one of a number of detents such as 9 and 10 on the edge of the turret 7 and thus hold a desired objective lens in alignment when photographing.

The blimp 3 is provided with a door 11 at its rear edge which is hinged as at 12 to allow access to the rear of the camera 1 and its associated film magazine 13 for making adjustments. A door 14 is also provided on the side of the blimp 3 to allow access for threading the camera. The door 14 is hinged along its lower edge as at 15 and is locked in position by means of a latch 16. The door 14 has a semi-cylindrical extension 17 thereon to accommodate a viewfinder 18 mounted on the side of the camera 1.

Referring to Fig. 4, the door 14 has a pair of windows 19 and 20 placed at its front and rear edge which register with the viewfinder 18. A window 21 is provided adjacent the photographing lens 5 to allow the lens to view the scene being taken.

The camera supporting plate 2 is mounted upon rubber cushions 22 and 23 of the type which is disclosed and claimed in the co-pending application of Robert P. Miller, Serial Number 25,622, filed June 8, 1935. Cushions 22 and 23 are secured to the floor 24 of the camera blimp 3 to prevent vibrations produced by the camera from being transmitted to the exterior of the blimp.

A viewfinder 18 having a universal focus or a manually adjustable focus is pivotally mounted at 141 to a bracket 25 which is removably secured within a dove-tail joint 26 provided on the front edge of the camera 1 as shown in Fig. 4. An extension 27 of the bracket 25 extends diagonally across the viewfinder 18 and has a distended end portion 28 which accommodates an elongated slot 29. The slot 29 receives a knurled set screw 30 threaded into the upper surface of the viewfinder 18. When taking wild shots or whenever it is desirable to take pictures without the follow focus device, the viewfinder may be clamped in any desired position by means of the set screw 30. When the follow focus device is used, this set screw 30 is either removed or loosened to allow it to move freely along the slot 29 as the viewfinder 18 is rotated about the point 141 by the follow focus device. A spring 31 is attached at one end to the viewfinder as at 32 and at the other end to the bracket 25 as at 33' to thus urge the viewfinder 18 towards the camera 1.

Referring now to Fig. 1, the bottom of the viewfinder 18 has a bracket 33 provided thereon in which is threadably mounted an adjustable stop screw 34. Locking nut 35 holds the stop screw 34 in any desired position.

Referring now to Fig. 11, a stop screw 34 is adapted to be engaged by a cam follower 36 which is pivotally mounted at 37 to a hub 38 provided on the lower end of a follow focus housing 39. The cam follower 36 has an arm 40 provided thereon which carries a cam follower wheel 41 attached to the end thereof. The cam follower 36 is adapted to be engaged and moved by any one of a series of involute shaped cams 42, 43, 44, 45, and 46 each of which is complementary to one of the objective lenses such as 4, 5, and 6.

Referring to Fig. 5, the cams 42–46 inclusive are secured on the end of a shaft 47. The opposite end of the shaft 47 is provided with a knurled knob 48. An indicator plate 49 is provided at the front of the housing 39 adjacent the knob 48 and bears indicia complementary to the various objective lenses. That is, the line marked 35 would be complementary to a 35 mm. lens; the line 40, complementary to a 40 mm. lens, etc. A series of detents 50 corresponding to the indicia provided on the indicator plate 49 is spaced along the bottom edge of the shaft 47 and is adapted to be engaged by a spring-pressed plunger 51 mounted in a projection 52' provided on a rotatable flanged member 52 which is secured to a ring gear 53 by screws 53'. The shaft 47 is slidably mounted within the member 52 but is prevented from relative motion by means of a key 54 which moves along a key way 55 provided in the shaft 47. The member 52 is mounted within a pair of ball bearings 56 and 57 which are secured within the hub 38 of the housing 39. Thus it will be seen that by positioning the knob 48 opposite one of the numbers on the indicator plate 49, a cam that has been especially designed for a lens of the particular focal length indicated will be positioned to control the movement of the cam follower 36 and through it the axial alignment of the viewfinder 18.

Referring now to Fig. 1, the upper part of the housing 39 is secured by means of a flexible joint generally indicated at 58 to the outer wall 59 of the camera blimp 3. A shaft 60 in axial alignment with the upper part of the housing 39 extends through the wall 59 and has secured at its outer end thereof an operating knob 61. The shaft 60 is rotatably mounted within the wall 59 by means of ball bearings 61 and 62 which are provided within a bearing housing 63 attached to the wall 59 by means of screws 64. A shaft 65 co-axial with the shaft 60 is mounted within the wall 142 of an enlarged annular casing 143 provided on the upper end of the housing 39 by means of a pair of ball bearings 66 and 67. The shaft 65 carries at one end a drum 68. The two shafts 60 and 65 are fastened together by means of a flexible joint generally indicated at 69. The joint 69 is formed by providing a disc of rubber 70 between the two flanged ends 71 and 72 of the shafts 60 and 65. Screws 73, 74, 75, and 76 (Fig. 8) secure the two flanges 71 and 72 to the rubber disc 70. The screws 73 and 75 are threadably secured within the flange 71 while the screws 74 and 76 are threadably secured to the flange 72. Enlarged apertures 77 and 78 are provided in the flange 71 adjacent the heads of the screws 73 and 75 to prevent any metallic connection between the two shafts 60 and 65. This construction is also true of the screws 74 and 76 thus preventing any undesirable vibrations created by the camera and its associated mechanism from being transmitted to the exterior of the blimp where it would create objectionable sound waves.

Figure 7:
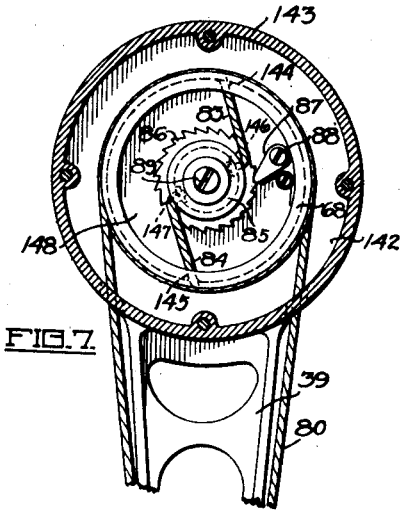
Fig. 7 is a sectional view showing the tension adjusting mechanism for the operating cable and is taken along the line 7—7 of Fig. 1.

Referring to Figs. 1 and 7, the drum 68 has a helical groove 79 provided on its outer circumference to receive a cable 80. The cable 80 is passed around a similarly grooved surface 81 of a lower drum 82 (Fig. 5) to secure a driving connection between the two drums, and its ends 83 and 84 are passed through apertures 144 and 145 in the drum 68 and are secured as at 146 and 147 within a bell-shaped ratchet member 85 having ratchet teeth 86 provided at its rear end. The teeth 86 are adapted to be engaged by a spring-pressed pawl 87 (Fig. 7) which is pivotally secured to the wall 148 of the drum 68 by means of a screw 88. The outer end of the ratchet member 85 is provided with a slot 89. A suitable tool such as a screw driver may be employed to rotate the ratchet member 85 and thus increase the tension of the cable 80. The lower drum 82 (Fig. 5) is divided into a pair of end members 90 and 91 which are secured to a central gear 92 by means of bolts 93 and 94. The gear 92 has a longitudinal aperture 150 therethrough to allow the cable 80 to pass from one section 90 of the drum 82 to the other section 91. The drum 82 is rotatably mounted on ball bearings 95 and 96 secured upon a sleeve 97. Sleeve 97 in turn is secured upon a bolt 98 which is passed through the side wall of the housing 39. The gear 92 engages the ring gear 53 provided on the shaft 47. Thus it will be seen that rotation of the knob 61 will effect rotation of the gear 92 and consequently, through the gear 53, the various cams 42–46 inclusive, to rotate the viewfinder 18 about its pivot point.

Figure 6:
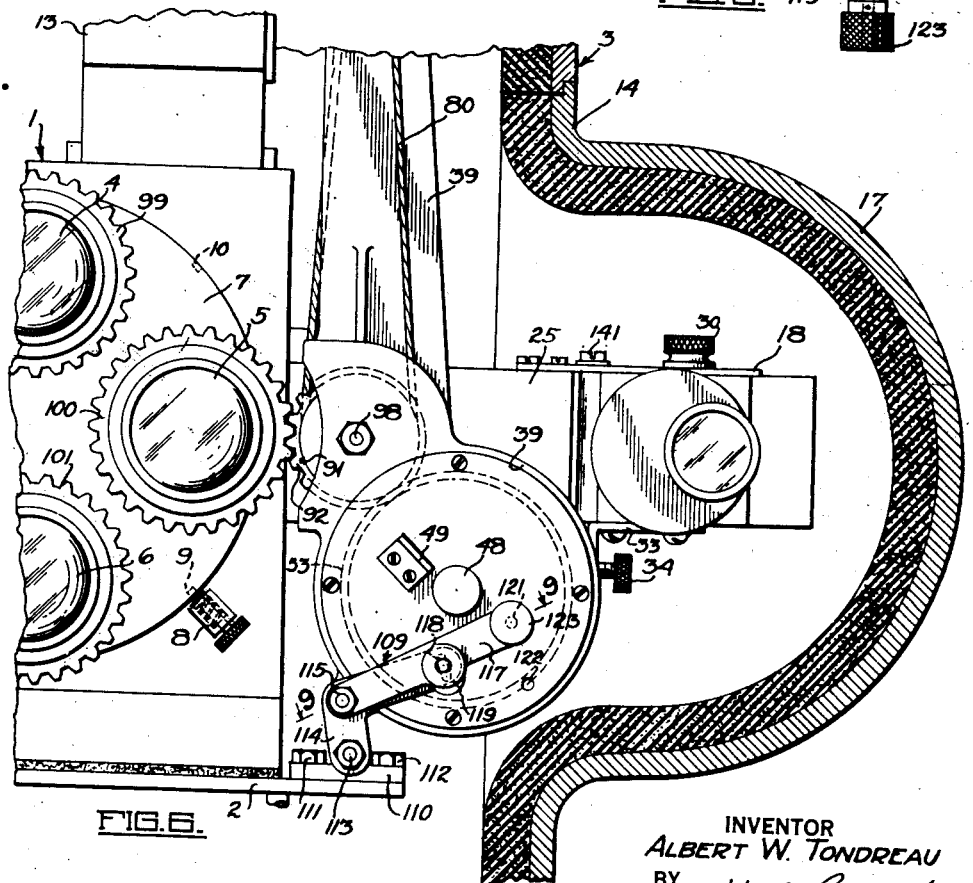
Fig. 6 is a front view of the lower part of the focus device taken along the line 6—6 of Fig. 3.

Referring now to Fig. 6, the gear 92 is also adapted to mesh with and rotate any one of a number of ring gears 99, 100, and 101 secured to the objective lenses 4, 5, and 6, it being understood that rotation of the objective lenses 4, 5, 6, etc., causes the said lenses to move in and out thus changing their focal lengths. Therefore, the rotation of the knob 61 will effect both the changing of the focal length of the objective lenses and also the stereo-parallax of the viewfinder 18. A circular indicator disc 102 (Fig. 5) is secured to the knob 61 and bears indicia of distance in feet for each of the objective lenses to indicate the distance in front of the camera at which an objection will be in focus. A series of graduated scales 103, 104, 105, 106, and 107 each complementary to a certain objective lens is provided on the disc 102. An adjustable pointer 108 is provided adjacent the disc 102 to designate the scale that is to be used and the range which is desired.

Figure 9:
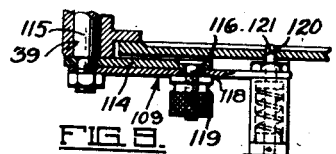
Fig. 9 is a section through the levers taken along the line 9—9 of Fig. 6.

Referring to Figs. 6 and 9, it will be noted that the follow focus device is adapted to be moved in and out to disengage the gear 92 from one of the ring gears as 100 provided on the objective lens 5. This is accomplished by providing a lever arrangement 109 on the lower portion thereof connecting the lower part of the follow focus housing 39 with the camera supporting plate 2. A bracket 110 is secured to the camera supporting plate 2 by means of bolts 111, 112, and has pivotally secured thereto by means of a bolt 113 an L-shaped lever 114. Lever 114 is also pivotally secured to the lower end of the follow focus housing 39 by means of a bolt 115. The other end of the lever 114 has a screw 116 secured thereto and projecting at right angles. A second lever 117 is also pivotally mounted to the housing 39 by the bolt 115 and has a transverse elongated slot 118 intermediate its end portions which receives the screw 116. The lever 117 may be secured in any desired angular position, within the limits of the slot 118 relative to the angle lever 114 by means of a locking nut 119. The purpose of the locking nut 119 is to allow the two levers 114 and 117 to be adjusted angularly in relation to each other and thus effect an adjustment of the follow focus device toward or away from the camera 1 and thus insure proper meshing of the gears 92 and 100. The end of the lever 117 is provided with a spring pressed plunger 120 which is adapted to be engaged in either one of two apertures 121 and 122. A knurled handle 123 is provided on the end of the spring pressed plunger 120 to allow for removal of the plunger by the fingers of the operator. Thus it will be seen that movement of the plunger 120 from the aperture 121 to the aperture 122 will cause the lower end of the follow focus device to move outward away from the camera 1 and thus disengage the gear 92 from the gear 100 to allow for rotation of the lens turret 7. Outward movement of the lower end of the follow focus device will cause the upper end to pivot about the flexible joint 58. A link 159 (Fig. 5) is pivotally mounted between the bolts 113 and 115 to the rear of the housing 39.

Figure 8:
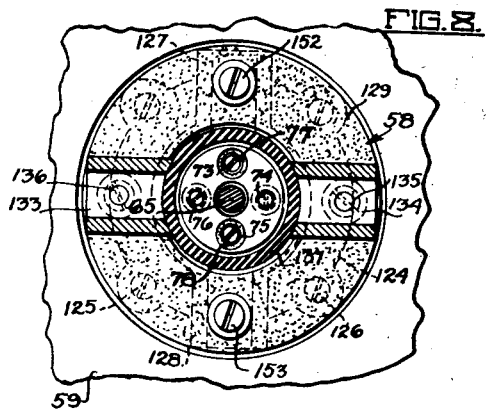
Fig. 8 is a sectional view showing the flexible connection between the upper end of the focusing device and the wall of the camera blimp taken along the line 8—8 of Fig. 1.

Referring now to Figs. 1, 2, and 8, I will describe the flexible joint 58 for supporting the follow focus device onto the wall 59 of the camera blimp 3. A circular plate 124 is secured to the wall 59 by means of screws 125 and 126 and has a pair of raised portions 127 and 128 against which is adapted to be secured a resilient ring 129 of rubber or other similar material by means of bolts 152 and 153. A second plate 130 similar to that of 124 is secured to the casing 143 of the housing 39 by means of screws 131 and 132. The plate 130 has also a pair of raised projections 133 and 134 which are adapted to engage the rubber ring 129 at right angles to the projections 127 and 128 on the plate 124. The rubber ring 129 is secured to the projections 133 and 134 by means of bolts 135 and 136. Thus it will be seen that metallic connection between the member 39 and the wall 59 of the camera blimp is prevented to insulate any vibrations created by the camera and its associated mechanism from being transmitted to the outside of the camera blimp. To further prevent transmission of sound or vibrations to the wall of the blimp, a rubber collar 137 is provided which is secured within annular openings 138 and 139 provided in the plates 124 and 130.

In the operation of this device, the plunger 120 (Fig. 6) of the lever 117 is moved to engage the aperture 122 to thus disengage the gear 92 from the gear 100 of the objective lens 5. The lens turret 7 is then rotated until a desired lens is brought into position in front of the photographing aperture and the lens barrel is rotated until the lens is set for infinity. The pointer 108 is then adjusted to a position where it will read along a scale on the indicator disc 102 which is complementary to the photographing lens being used by releasing a clamp screw 155 (Fig. 10) which allows the pointer 108 to slide up or down in a guide block 156 secured to the wall 59 of the blimp as by screws 157. The knob 61 is then rotated until the scale also reads infinity. The plunger 120 is then returned to its normal position at which time it engages the aperture 121 to allow the teeth of the gear 92 to mesh with the teeth of the ring gear provided on the desired lens. The viewfinder 18 is then manually moved outward against the action of the spring 31 (Fig. 4) to allow the knob 48 provided on the end of the shaft 47 (Fig. 5) to be moved along the scale 49 to a position opposite the number corresponding to the focal length of the particular lens being used. Referring to Fig. 11, the cam follower 36 has a spring 156 attached thereto as at 157, the other end being attached as at 158 to the housing 39. On manual movement of the viewfinder 18 outwardly away from the camera 1, the spring 156 also moves the cam follower 36 outward to clear the cam follower wheel 41 from the cams 42 to 46 inclusive until the desired cam is placed in position. In this position, one of the cams 42, 43, 44, 45, or 46 corresponding to the particular photographing lens being used will then be positioned opposite the cam follower 36. Thus it will be seen that by rotating the knob 61 so that the pointer 108 indicates the distance in feet commensurate with the distance of the object being photographed from the objective lens of the camera that movement will be transmitted to the gear 92 (Fig. 5) which will advance or retract the lens barrel 5, through engagement with the ring gear 100, to keep the objective lens properly in focus and at the same time rotate the gear 53 and consequently the cams 42–46 inclusive to pivot the viewfinder about the point 141 and thus keep it in correct alignment with the object being photographed.

Having thus described the invention, what is claimed as new and desired to secure by Letters Patent, is:

1. View finder apparatus for a motion picture camera comprising a lens turret for said camera adapted to support a plurality of different objective lenses, means for mounting a plurality of cams corresponding in number to said objective lenses, a follower mounted adjacent said cams and adapted to engage with a selected one of said cams, means for selecting a certain cam for engagement with said follower, a view finder contacting said follower and adapted to be moved by said follower, and means interconnecting said cams and a selected objective lens for simultaneously focusing said selected objective lens and for rotating said cams.

2. View finder apparatus for a motion picture camera comprising a lens turret for said camera adapted to support a plurality of different objective lenses, a finder, means for pivotally supporting said finder adjacent said camera, means including a plurality of rotatable cams interposed between said camera and said finder for laterally shifting the axis of said finder in coordination with the focusing movement of each of said objective lenses, means for selecting a cam for a particular objective lens, and means for interconnecting said cams and a selected lens for simultaneous movement thereof.

3. View finder apparatus for a motion picture camera having a lens tube provided with a ring gear, said apparatus comprising a view finder adapted to have its optical axis shifted in a substantially horizontal plane, a support, a drive gear and a second gear continually in mesh with said drive gear mounted in said support, means under control of the rotation of said second gear for laterally shifting the axis of said view finder, means for mounting said support for pivotal movement with respect to said camera to mesh and unmesh said drive gear with relation to said ring gear, and means for operating said drive gear from a remote point.

4. In combination, a motion picture camera having a photographing aperture, a plurality of objective lenses of different characteristics mounted adjacent said aperture, means for selectively positioning one of said lenses in front of said aperture, a view finder pivotally mounted adjacent said aperture, means for selectively controlling the alignment of said view finder to correspond to the field of view of a predetermined objective lens, a sound-proof casing for said camera, means adjacent the outside of said soundproof casing for remotely controlling said last-mentioned means, and means for insulating said last-mentioned means from said sound-proof casing.

5. In combination, a motion picture camera having a plurality of photographing lenses of different characteristics, a universal focus view finder pivotally mounted adjacent said camera, means exclusive to each of said photographing lenses for controlling the axial alignment of said view finder to correspond to the field of view of each of said photographing lenses, a sound-proof casing for said camera and said view finder, a pair of windows in said sound-proof casing in axial alignment with said view finder, and means adjacent said sound-proof casing for remotely controlling the focus of a pre-selected photographing lens and the corresponding axial alignment of said view finder, said means being resiliently mounted on said casing.

6. The combination of a motion picture camera having a plurality of photographing lenses of different focal characteristics, a universal focus view finder pivotally mounted adjacent said camera, means for focusing a pre-selected photographing lens, said means controlling the alignment of said view finder to correspond to the field of view of said lens and comprising an involute shaped cam for each of said lenses, a spring-pressed follower mounted on said view finder and controlled by movement of one of said cams, a sound-proof casing for said camera and said view finder, a pair of windows in said sound-proof casing in axial alignment with said view finder, and means adjacent said sound-proof casing for remotely controlling said focusing means of said objective lens, said means being insulated against vibration from said casing and said focusing means.

7. In a motion picture soundproof camera, the combination of a motion picture camera, a soundproof casing surrounding said camera, a view finder positioned adjacent said camera, means interposed between said view finder and said camera for adjusting the angular relationship between the axis of said view finder and the axis of said camera, said means including a plurality of cams having different shapes, a plurality of objective lenses for said camera, means for interconnecting each of said lenses with a cam of a particular shape, an adjustable belt means for interconnecting said last mentioned means with a control means, a portion of said control means extending exteriorly of said soundproof casing, and means for resiliently connecting the portion of said means extending without said casing and said control means within said casing to prevent vibrations of said camera from being transmitted without said casing.

8. Viewfinder apparatus for a motion picture camera having a lens tube provided with a ring gear, said apparatus comprising a viewfinder adapted to have its optical axis shifted in a substantially horizontal plane, a support, a drive gear and a second gear mounted in said support, means under control of the rotation of said second gear for laterally shifting the axis of said viewfinder, means for mounting said support for movement with respect to said camera to mesh and unmesh said drive gear with relation to said ring gear, while leaving said drive gear in mesh with said second gear, and means for operating said drive gear.

9. Camera operating mechanism comprising the combination of a casing having a rigid wall and a lining of sound deadening material therefor, an aperture in said wall and in said material, a bearing fixed to said wall and mounted in said aperture, a shaft in said bearing, a handle outside of said wall on said shaft, a stub shaft, resilient coupling between said first mentioned shaft and said stub shaft, a bearing for said stub shaft, a housing for said last mentioned bearing, means for resiliently supporting said housing from said wall, and camera mechanism under control of said stub shaft.

10. The combination of a camera, a viewfinder pivotally mounted thereon, a bearing, a speed control shaft slidably and rotatably mounted in said bearing, a gear keyed to said shaft for rotating the same, a hand operating device for rotating said gear, a plurality of different shaped cams on said shaft, a cam follower adapted to selectively engage said cams and connected to said viewfinder for pivotally moving the same to change the angle between the axis of the camera and the axis of the view finder, said shaft being slidable along its axis to select a desired cam and being rotatable about its axis to rotate said cams and means co-operating with said shaft for selectively locking the same in positions to hold a selected one of said cams in engagement with said cam follower.

ALBERT W. TONDREAU.